US008613044B2

(12) United States Patent
Casey et al.

(10) Patent No.: US 8,613,044 B2
(45) Date of Patent: Dec. 17, 2013

(54) DELEGATING OR TRANSFERRING OF ACCESS TO RESOURCES BETWEEN MULTIPLE DEVICES

(75) Inventors: Tamara L. Casey, Henderson, NV (US); Paul-Andre Raymond, Reston, VA (US); Ilya Ziskind, Sterling, VA (US); David P. Martin, Chantilly, VA (US)

(73) Assignee: 4DK Technologies, Inc., Herndon, VA (US)

( * ) Notice: Subject to any disclaimer, the term of this patent is extended or adjusted under 35 U.S.C. 154(b) by 1550 days.

(21) Appl. No.: 11/767,028

(22) Filed: Jun. 22, 2007

(65) Prior Publication Data

US 2008/0320560 A1 Dec. 25, 2008

(51) Int. Cl.
*G06F 21/00* (2013.01)
(52) U.S. Cl.
USPC ...... 726/3; 726/8; 726/27; 713/171; 713/185; 380/201; 709/230; 705/51; 705/54
(58) Field of Classification Search
USPC ....................................................... 726/2, 3
See application file for complete search history.

(56) References Cited

U.S. PATENT DOCUMENTS

| | | | | |
|---|---|---|---|---|
| 6,023,714 A * | 2/2000 | Hill et al. | ...................... | 715/235 |
| 6,279,111 B1 * | 8/2001 | Jensenworth et al. | .......... | 726/10 |
| 6,820,063 B1 * | 11/2004 | England et al. | .................. | 705/54 |
| 7,496,540 B2 * | 2/2009 | Irwin et al. | ....................... | 705/59 |
| 7,552,322 B2 * | 6/2009 | Balfanz et al. | ................. | 713/159 |
| 7,725,404 B2 * | 5/2010 | Sellars et al. | .................... | 705/76 |
| 8,108,921 B2 * | 1/2012 | Shin et al. | .......................... | 726/8 |
| 2002/0196912 A1 * | 12/2002 | Norris | ......................... | 379/88.17 |
| 2004/0249768 A1 * | 12/2004 | Kontio et al. | ................... | 705/65 |
| 2005/0071669 A1 * | 3/2005 | Medvinsky et al. | ........... | 713/200 |
| 2005/0138193 A1 * | 6/2005 | Encarnacion et al. | ........ | 709/230 |
| 2006/0112015 A1 * | 5/2006 | Chancellor et al. | ............. | 705/51 |
| 2006/0291474 A1 * | 12/2006 | Ollis et al. | .................. | 370/395.5 |
| 2007/0027812 A1 * | 2/2007 | Ogawa et al. | ................... | 705/57 |
| 2007/0075135 A1 * | 4/2007 | Dettinger et al. | .......... | 235/382.5 |
| 2007/0112676 A1 | 5/2007 | Kontio et al. | | |
| 2008/0154780 A1 * | 6/2008 | Soukup et al. | .................. | 705/54 |

OTHER PUBLICATIONS

PCT International Search Report and Written Opinion, PCT/US2008/060704, Aug. 26, 2008, 13 pages.

* cited by examiner

*Primary Examiner* — Morshed Mehedi
(74) *Attorney, Agent, or Firm* — Fenwick & West LLP

(57) ABSTRACT

A gatekeeper device delegates an ability to access a resource to an access device by transmitting metadata, which includes access information for accessing the resource. The access device uses the metadata to retrieve the associated resource from a resource server. By transmitting the metadata in lieu of the resource, flexible use of the resources is implemented while enabling compliance with various restriction schemes. The system may condition the delegation or transfer of resource access on one or more factors, such as proximity between the gatekeeper device and the access devices. Using information about an access device, the resource server may optimize the resources for the receiving access device.

49 Claims, 11 Drawing Sheets

DELEGATING OR TRANSFERRING OF ACCESS TO RESOURCES BETWEEN MULTIPLE DEVICES

BACKGROUND OF THE INVENTION

The present invention relates generally to media sharing and management, and more specifically, to delegating or transferring one device's access to resources to one or more access devices.

Resources in the form of digital data are compatible across various devices such as audio players, computers, and portable media players. For example, resources such as an MP3 file may be listened to using a portable MP3 player, as well as a personal computer, a home resource server or a Personal Digital Assistant (PDA). With the convergence of the devices, people are presented with an increasing number of access devices from which the resources may be accessed. Therefore, more and more people use different devices in the same or different places to access the same resource.

Accessing the same resources on multiple devices, however, poses various issues. One of the issues is that it is inconvenient to transfer resources between devices. To access the same resource, the resources must be transmitted from an originating device to a destination device. Transmitting the resource between devices may take much time or bandwidth, and cause inconvenience to the users.

Another issue is imposing restrictions to the shared resources. The access to the resources may be restricted for commercial reason as well as privacy or security reasons. An example of restricting access for commercial reasons is digital rights management (DRM) technology. The DRM technology is used by publishers or copyright owners to control access to or usage of the resources. The DRM schemes often restrict sharing of resources between multiple users or across multiple devices. Moreover, some DRM schemes are not compatible with other DRM schemes. Therefore, if one form of a resource is subject to one DRM scheme for one device and another form of the same resource is subject to another DRM scheme for another device, the two forms of the resource must be individually purchased to access the resource on two separate devices.

An example of restricting access to resources for privacy reasons is medical records. The medical records are very valuable and useful if shared by appropriate medical personnel. On the other hand, access to the medical records must be restricted to preserve the privacy of the patients.

Another issue in sharing access to the resources across multiple devices is that it concentrates much of the communication traffic on the originating device. For example, if the user wants to share the same resource across several devices, the whole resource must be transmitted from the originating device to the several devices. The problem is exacerbated if the number of shared resources is increased. The data that must be transmitted from the originating device to the devices increases in proportion to the number of resources shared.

There is also the issue of differing capabilities of different devices. Each device may have different hardware or software configuration. As a result, each device may have different capabilities. For example, a standard television is capable of displaying images having 480 lines whereas a high-definition television is capable of displaying images having 1080 lines. Because of the different capabilities, the formats of the resources that may be accessed from different devices may differ. For example, a movie clip encoded for a high-definition television may not be displayable on a standard-definition television. Moreover, the resource may be optimized differently for devices having different capabilities.

SUMMARY OF INVENTION

Embodiments of the invention enhance user's ability to consume resources in all forms by mitigating technical and business constraints while minimizing the user's involvement in such tasks. The technical and business concerns associated with accessing resources at multiple access devices are resolved to allow the user to more conveniently consume and enjoy resources. The metadata associated with the resource are communicated between the access devices to enable multiple access devices to access a resource either through delegation or transfer of access to the resource. This abstracts from the user how to delegate or transfer access to the resource, and beneficially facilitates the user to access the resource from multiple devices while complying with any restrictions imposed on accessing the resource.

In one embodiment of the invention, access to a resource is delegated or otherwise transferred from a gatekeeper device to an access device by transferring metadata associated with the resource. The device includes a trusted client that enforces restrictions to accessing the resource. The metadata is sent from the gatekeeper device to the device. Using the received metadata, the device sends metadata to a resource server that may provide the resource associated with the metadata to the device. Then, the resource server sends the resource to the device after validating the access information included in the metadata.

The access information comprises information associated with digital rights management (DRM). The access information may define restrictions on the right to access the resource. The restrictions to the access of the resource may include various restrictions such as encoding type or maximum bit rate of the resource. The restriction may be proximity between the gatekeeper device and the access device.

In one embodiment, the device sends device information to the resource server storing the resource. The device information represents the capabilities of the device, such as display resolution and maximum permissible file size of the resource. The resource server may then convert and send the resource to the device in a format optimized or otherwise more suitable for the access device.

In one embodiment, the gatekeeper device detects multiple access devices in proximity to the gatekeeper device. The user may select one or more devices to which access to the resource should be given. Alternatively, the gatekeeper device may automatically detect and grant access to the most capable access device or an access device that is preset by the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
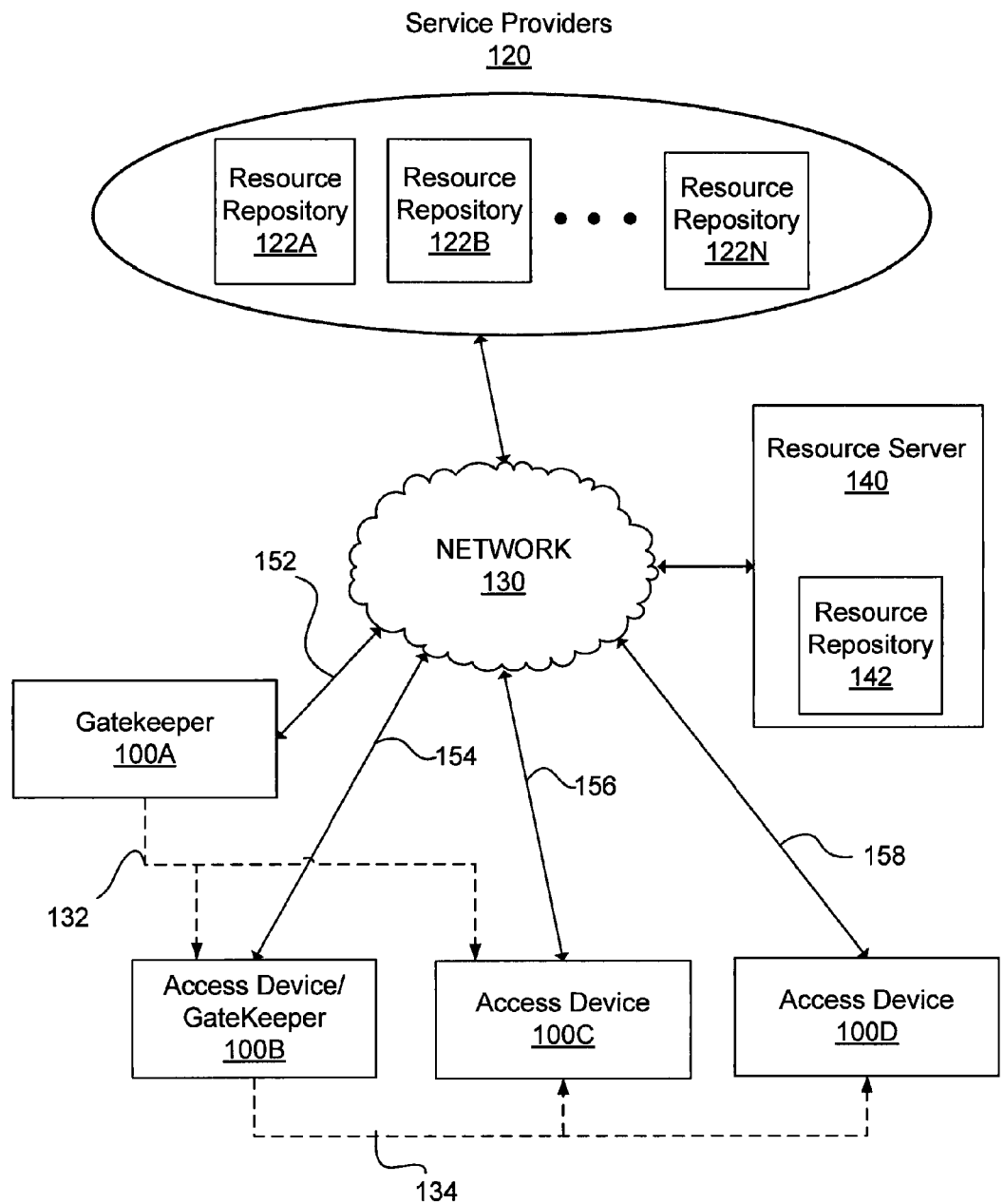
FIG. 1 is a diagram showing a network structure including a gatekeeper device, multiple devices, resource repositories, and a resource server, according to one embodiment.

The embodiments of the present invention will be described below with reference to the accompanying drawings. Like reference numerals are used for like elements in the accompanying drawings.

Embodiments of the present invention abstract a resource to metadata and exchange metadata between a gatekeeper device and an access device in lieu of the resource. In embodiments of the present invention, a gatekeeper device sends metadata to one or more access devices. The metadata includes access information that allows the access devices to access a resource pursuant to one or more restrictions. The restrictions may include, for example, the number of times the resource may be accessed, the duration the access is allowed, whether the whole resource may be accessed or only a portion of the resource may be accessed, or a maximum distance (i.e., proximity) between the gatekeeper device and the access device.

A gatekeeper device is a device that is capable of delegating or transferring resource access to another gatekeeper device or an access device. The gatekeeper device sends the metadata or other access information to other gatekeeper devices or access devices to delegate or transfer access to the resource. It is not essential that the gatekeeper device have capabilities to access the resource.

An access device is a device that is capable of accessing the resource. The access device includes a trusted client that enforces any restrictions on accessing the resource according to the metadata received from the gatekeeper device. A device may be both an access device and the gatekeeper device. For example, an access device that receives the metadata from a gatekeeper device may itself become a gatekeeper device when it sends the metadata to another access device. The access device, among other devices, may be a personal computer, an MP3 player, a mobile phone, a smart phone, a PDA (Personal Digital Assistant), a resource server, a video game console, an eBook reader, a media server, a television set, a car stereo, a satellite radio, a slingbox, a projector screen, and medical devices.

The resource may comprise any types of digital information that may be accessed through the access devices. The resource may include, among others, media items, application programs, private records (e.g., medical records), proprietary information (e.g., trade secret), and confidential information.

Overview of Architecture for Accessing Resource from Multiple Devices

FIG. 1 is a diagram showing a network structure including a gatekeeper device 10A, gatekeeper/access device 100B, access devices 100C-D, resource repositories 122A-N, and a resource server 140, according to one embodiment.

In one embodiment, the gatekeeper 100A and the access devices 100B-D communicate with the resource server 140 through a network 130. Specifically, the gatekeeper 100A and the access devices 100B-D are connected to the network 130 through connections 152-158. In the example of FIG. 1, device 100B is an access device as well as a gatekeeper device. The device 100B is an access device when it receives metadata 132 from the gatekeeper 10A, and the device 100B is a gatekeeper device when it sends metadata 134 to the access device 100D. The device 100B will hereinafter be referred to as the access device 100B as well as the gatekeeper device 100B.

The access devices 100B-D may be any of various computing devices capable of accessing the resources. In one embodiment, the access devices 100B-D are disparate devices with different hardware and/or software configurations. One gatekeeper device 100A and three access devices 100B-D are shown in FIG. 1 for the purpose of illustration only, and any number of gatekeeper devices or access devices may be used. The gatekeeper device 10A, and the access devices 100B-D may be owned by the same user, or they may be owned by different users.

The gatekeeper 100A and the access devices 100B-D communicate with each other through either the network 130 or a peer-to-peer communication channel (not shown). The network 130 may be in any form including without limitation: Internet, cable TV network, PSTN (Public Switched Telephone Network), radio network, cellular network, satellite TV network, Wi-Fi network, workplace enterprise network, and any combination thereof The peer-to-peer communication channel (not shown) may likewise be in any form, including without limitation: wired communication channel (e.g., RS232C, USB), infrared communication channel (e.g., Infrared Data Association (IrDA) channel), and RF communication channel (e.g., Wi-Fi or Bluetooth) or an RFID communication. The gatekeeper devices 100A-B send the metadata 132, 134 to the access devices 100B-D via the network 130 or through the peer-to-peer communication channel.

The metadata 132, 134 may include, among other data, resource information and access information. The resource information identifies one resource from another resource. In one embodiment, the resource information includes ID3 tags or APEv2 tags. In another embodiment, the resource information includes a Universal Resource Locator (URL) address from which the resource may be retrieved.

As explained below in detail with reference to FIG. 4, the resource server 140 may be any computing device that may perform some or all of the following functions: validation of the access information; locating and retrieving the resources; and communicating with the gatekeeper 100A, the access devices 100B-D, and the resource repositories 122A-122N. The resource server 140 may be a computer device dedicated to the above functions, or it may be a general computer device performing the above functions in addition to other functions. The resource server 140 may be a single computing device, or it may be a group of computing devices.

The resource server 140 communicates with the access devices 100B-D to authenticate the access devices 100B-D, validate the metadata, and send the resource associated with the metadata to the access devices 100B-D. To authenticate the access device, the resource server 140 may include a database (not shown) for storing profiles of the users and the access devices.

In another embodiment, the gatekeeper devices 100A-B and the access devices 100B-D perform only peer-to-peer communication. The gatekeeper devices 100A-B and the access devices 100B-D do not perform any communication with the resource server 140 over the network. In this embodiment, the access devices 100B-D have resources preinstalled, and need not be received from other sources such as the resource server 140. The metadata 132, 134 sent from the gatekeeper device 100A-B to the access devices 100B-D functions as a key that unlocks the resources already installed on the access devices 100B-D, and enables the access devices 100B-D to access the resource associated with the metadata 132, 134.

Gatekeeper Structure

Figure 2A:
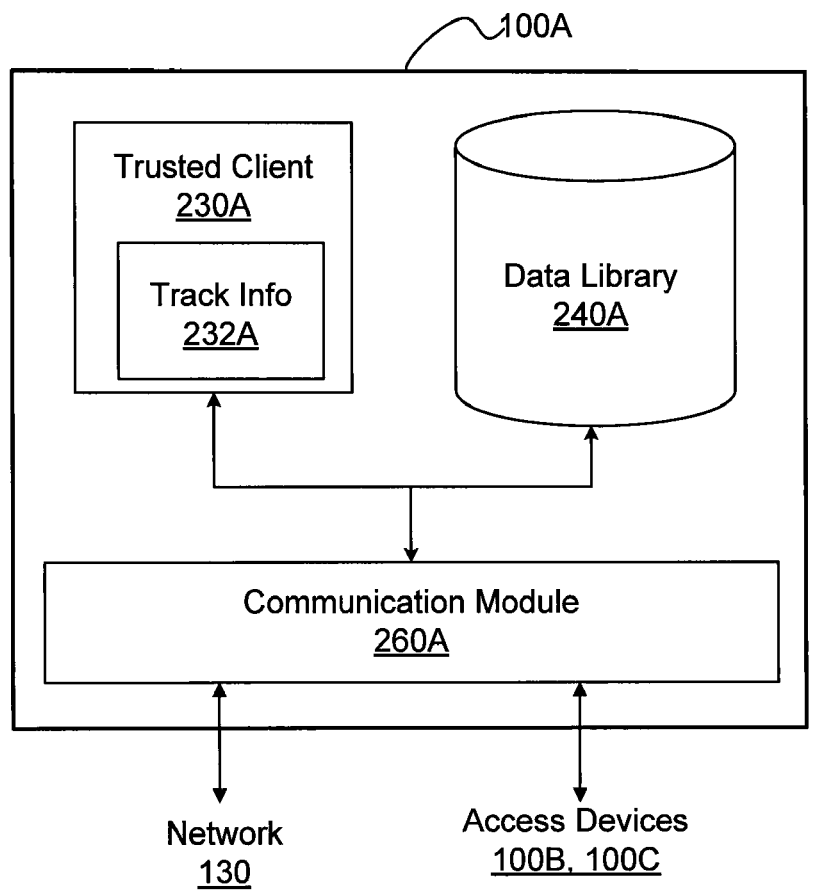
FIG. 2A is a block diagram illustrating a gatekeeper device according to one embodiment.

FIG. 2A is a block diagram illustrating a gatekeeper device 100A according to one embodiment. The embodiment of FIG. 2A is a simplified version of the gatekeeper device that includes only essential elements. The gatekeeper device 100A of this embodiment does not include components to access the media on the gatekeeper device 100A and may therefore be incapable of accessing the resource. In one embodiment, the gatekeeper device 100A is implemented as an electronic key fob or contactless smartcard operating based on radio-frequency identification (RFID) technology. The key fob or smartcard may be of a passive type that does not require internal power supply. The gatekeeper device 100A may receive energy (e.g., electromagnetic energy or electric current) from the access device it is interacting with.

The gatekeeper device 100A includes, among other components, a trusted client 230A, a data library 240, and a communication module 260A. These components are briefly explained herein to the extent they are directly related to the invention.

In one embodiment, the gatekeeper device 100A does not have the capabilities to communicate directly with the resource server 140. Instead, the gatekeeper device 100A may communicate with the resource server 140 via the access devices, or it may not perform any communication with the resource server 140.

The trusted client 230A is a metadata manager that manages and tracks transmission of the metadata or reception of the metadata via the communication module 260A. The trusted client 230A may also store tracking information 232A. The trusted client 230A uses tamper resistant software, tamper resistant hardware, or a combination of tamper resistant software and hardware to be tamper proof or resistant.

The communication module 260A may be a radio frequency (RF) transceiver using conventional communication protocols, or any other mechanism suitable for communicating as described herein. The communication module 260A performs any communication to and from the access device, and if implemented, to and from a resource server 140.

The data library 240A stores the metadata as explained below in detail with reference to FIG. 3. The data library 240A may be implemented by various storage devices including, without limitation, a flash memory device, a hard disk, a floppy disk, and Random Access Memory (RAM).

The trusted client 230A manages the data library 240A and ensures that the metadata sent to the access device 230 complies with any restriction of use imposed, for example, by the DRM schemes used in connection with the resources as explained in detail below with reference to FIG. 3. The DRM scheme may limit the maximum number of times the metadata may be transmitted to the access devices. In this case, the trusted client 230A keeps track of the metadata transmission in the tracking information 232A and ensures that the number of metadata transmission does not exceed the limit. The trusted client 230A may be implemented as hardware, software or a combination thereof.

In one embodiment, the trusted client 230A is tamper proof or tamper resistant so that unauthorized modification to the metadata or the tracking information 232A is impossible or very difficult. The trusted client 230A also detects any unauthorized modification to the data library 240A, and prevents users from illegally circumventing any restrictions under the DRM scheme. If unauthorized modification is detected, the trusted client 230A may lock the gatekeeper device 100A from operating, or purge all the information from the data library 240A.

Gatekeeper with Access Device Functionality

Figure 2B:
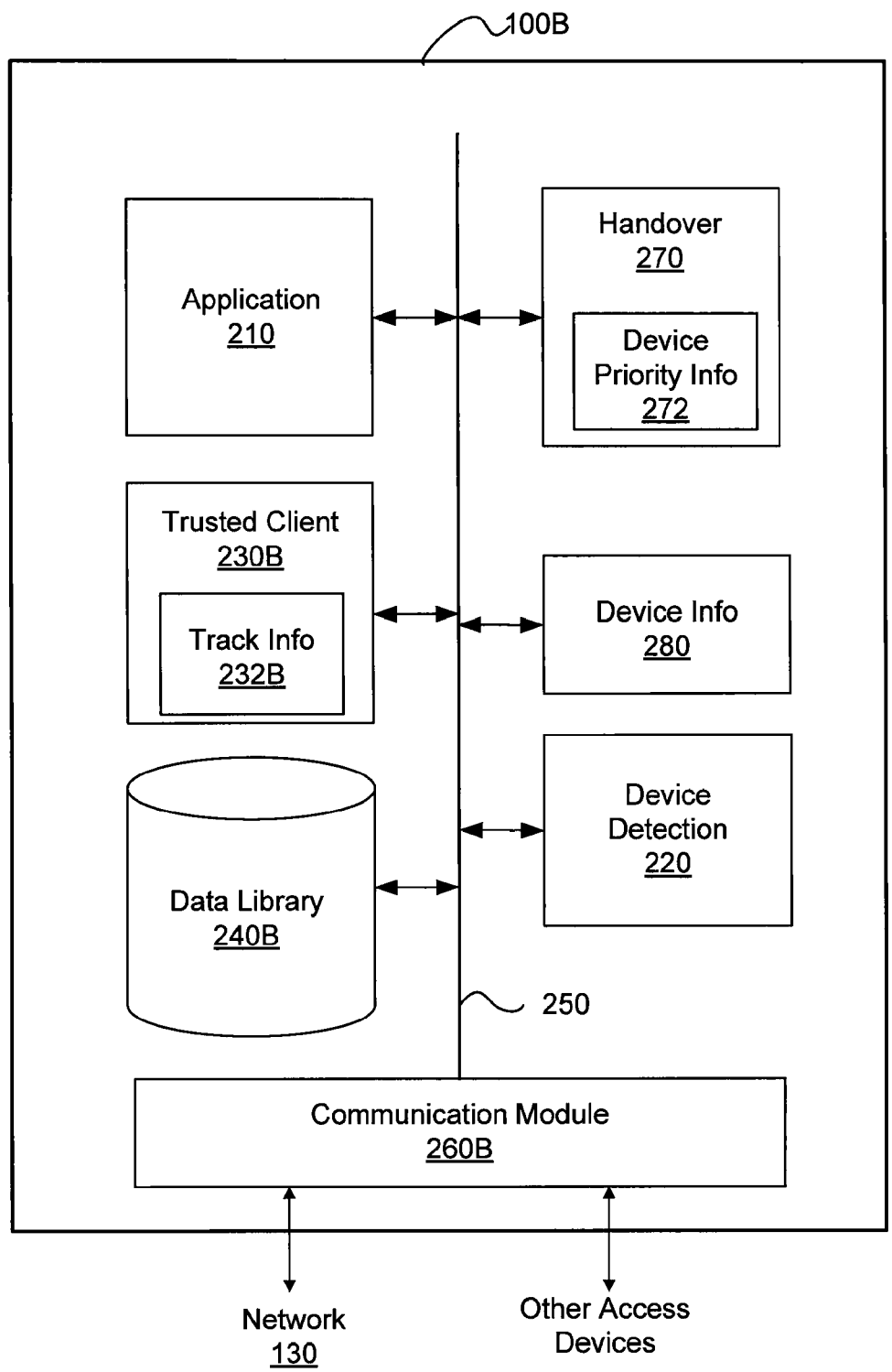
FIG. 2B is a block diagram illustrating a gatekeeper device according to another embodiment.

FIG. 2B is a block diagram illustrating a gatekeeper device 100B (hereinafter referred to as "device 100B") with access device functionality, according to one embodiment. In this embodiment, the gatekeeper device 100B not only performs the functions of storing and sending metadata, but the gatekeeper device 100B may also access the resources. The device 100B functions as an access device when it receives the metadata from a gatekeeper (referring to FIG. 1, for example, the device 100B receives the metadata 132 from gatekeeper 100A). Conversely, the device 100B functions as a gatekeeper device when it sends the metadata to an access device (referring to FIG. 1, for example, the device 100B sends the metadata 134 to an access device 100D). In one embodiment, the gatekeeper device 100B is a cell phone, a personal digital assistant (PDA) or a portable game player.

The device 100B comprises an application module 210, a device detection module 220, a trusted client 230B, a data library 240B, a handover module 270, a device information module 280, and a communication module 260B. The modules of the 100B communicate with each other via a bus 250. The modules and components of the device 100B are explained herein to the extent they are directly related to the invention.

The application module 210 runs a single media application or multiple media applications on the gatekeeper device 100B. The media applications may include, among other programs, video and music players, web browsers, image viewers, document viewers, and word processors.

The trusted client 230B authenticates the device 100B by sending authentication information to the resource server 140 via the network 130. The authentication may be performed using various methods, including among other methods, credit card information provided by a user of the device 100B, a combination of a user ID and a password, public keys, secret codes shared by users, and digital signatures. After authenticating the device 100B, the trusted client 230B manages the metadata to ensure that the access to the resource associated with the metadata is performed within the restrictions imposed by the metadata. When a user of the access device 100B initially purchases a license to a resource, the trusted client 230B generates or receives the metadata and stores it in the data library 240B. The trusted client 230B also functions to retrieve the resource associated with the metadata from the resource server 140 via the communication module 260B.

In this embodiment, the trusted client 230B includes track information 232B for tracking any delegation or transfer of access to the resource to other access devices. The delegation or transfer of access includes both the transfer of a license and a sublicense as explained below in detail, as explained in detail below in the section entitled "Delegation or Transfer of Access to Resources." The transfer of the license refers to the case where access the resource is no longer permitted to the gatekeeper device 100B whereas the sublicense refers to the case where the gatekeeper device 100B (as well as the access device receiving the metadata from the gatekeeper device 100B) maintains right to access the resource. The transfer of the license or sublicense is accomplished by sending the metadata to the access devices, as explained below in detail with reference to FIGS. 5A-5C.

In one embodiment, the trusted client 230B sends the metadata or other access information indicating transfer of license or sublicense to the resource server 140. The resource server 140 may validate the request from the access devices to access the resource using the metadata or the access information received from the gatekeeper device 100B, as explained in detail below with reference to FIG. 4. Any method of transferring files may be used to transfer the metadata or the access information from the gatekeeper device 100B to the access devices 100C-D and the resource server 140.

In one embodiment, part of the metadata (e.g., authentication information) sent by the gatekeeper device 100B to the media devices 100C-D may be relayed to the resource server 140. The relayed information may be encrypted so that the relayed information cannot be decoded or modified by the media devices 100C-D, and can only be relayed over to the resource server 140.

The data library 240B stores the metadata and the resource as explained below in detail with reference to FIG. 3. The data library 240B stores the resource in addition to the metadata in contrast to the embodiment of FIG. 2A because the device 100B may access the resource. The gatekeeper device 100A of FIG. 2A does not have the capabilities to access the resource, and therefore, the resource need not be stored in the data library 240A. The data library 240B may be implemented by various storage devices including, without limitation, a flash memory device, a hard disk, a floppy disk, and Random Access Memory (RAM).

The device detection module 220 of the device 100B detects access devices. In one embodiment, the device detection module 220 of the device 100B may be detected by using information such as contact information or IP addresses of other access devices available to the device 100B from other applications installed on the access devices or from other external servers. The device detection module 220 may ping other access devices using the available information to detect other access devices.

In another embodiment, the device detection module 220 detects other access devices located in proximity to the device 100B. The distance between the access devices may be determined by using wireless signals. The proximity between the access device, for example, may be detected by the gatekeeper device (or the access devices) sensing Bluetooth signals from the access devices (or the gatekeeper device). Alternatively, the distance between the access devices may be determined by detecting presence of signals in a wire (e.g., Universal Serial Bus (USB) cable) indicative of an access device coupled to the wire. The wire may have a limited length or assumed length that defines the proximity of the access devices.

The communication module 260 implements communication channels between the device 100B and the network 130 or other devices. The communication module 260 may include multiple sub-modules for establishing multiple communication channels. In one embodiment, the communication module has a first sub-module for communicating with the network 130, and a second sub-module for establishing a peer-to-peer communication channel with other access devices. For example, the communication module 260 may include a first sub-module which is an Evolution-Data Optimized (EVDO) communication module for communicating via a radio frequency that may communicate over an extensive distance, and a second sub-module which is a Bluetooth module for communicating via a radio frequency that reaches much shorter distance compared to the EVDO communication module.

In another embodiment, the communication module 260 uses the same communication module for establishing communication with the network 130 and the peer-to-peer communication. For example, the same Wi-Fi communication may be used to connect to the network 130 and to communicate peer-to-peer with other access devices. In this example, the signal strength of the radio signals may be used to determine the proximity between the access devices.

In one embodiment, the communication module 260 generates a heartbeat signal to determine proximity between the gatekeeper device 100B and the access devices 100C-D. The heartbeat signal may be a wireless signal that is detected by the other access devices 100C-D to determine whether the devices are in proximity. If the heartbeat signal is no longer detected or is below certain strength, then the access devices 100C-D are determined as not being close to each other. In one embodiment, if the heartbeat signal is no longer detected or is below certain strength, the trusted clients 230B of the access device 100C-D terminates access to the resource.

The device information module 280 generates and maintains device information of the device 100B. The device information includes information related to capabilities of the device 100B; and, this device information is used by the resource server 140 to determine compatible or optimal media formats for the device 100B. The device information may include, among other information, types of resources accessible by the access device 100B, types and versions of media formats compatible with the application programs installed on the access device 100B, hardware configurations (e.g. maximum screen resolution and processor speed), communication latency or reliability, and the list of applications installed on the device 100B.

As explained below in detail with reference to FIGS. 5A-5C, and 6, the device information is sent from the device 100B to the resource server 140 so that the resource server 140 may send the resource to the access device 100B in a format suitable or optimal for the device 100B. The device information may be updated periodically or whenever changes in hardware or software configuration of the device 100B occur.

The handover module 270 implements handover operations in which access to the media on the device 100B is terminated, and the access to the media on the access device is initiated. When candidate access devices for delegating or transferring access to the resources are detected by the device detection module 220, the handover module 270 may display the detected access devices for the user to select, or it may automatically hand over the access of the resource to the access devices, as explained below in detail with reference to FIG. 6.

In one embodiment, the handover module 270 includes device priority information to facilitate the selection of the access device by a user. The device priority information represents the user's personalized priority of the candidate access devices (to which access to the resource is to be delegated) be displayed on the device 100B. The priority information may be preset by the user. Alternatively, the handover module 270 may determine priority of access devices to be delegated access to the resource based on the history of the user's prior selection of the access devices. In one embodiment, the handover module 270 uses the device priority information to display the detected access devices in the descending order of priority to the user, as explained in detail with reference to FIG. 7.

In one embodiment, the device 100B determines the optimal access device for accessing the resource, and automatically hands over the access to the optimal access device when such optimal access device is detected. For example, the user watching a movie clip on a small screen of the device 100B (e.g., a mobile phone), enters his home where another access device 100D (e.g., a flat panel TV) with a large screen is installed. In this example, the device 100B may automatically hand over the access to the movie clip from the device 100B to the access device 100D.

Each of the modules of the device 100B may be implemented separately or may be implemented together. For example, the device detection module 220, the device information module 280, and the handover module 270 may be implemented as one module. Moreover, each module, whether alone or in combination with other modules, may be implemented for example, in software, hardware, firmware or any other combination thereof.

Access Device without Gatekeeper Capability

Figure 2C:
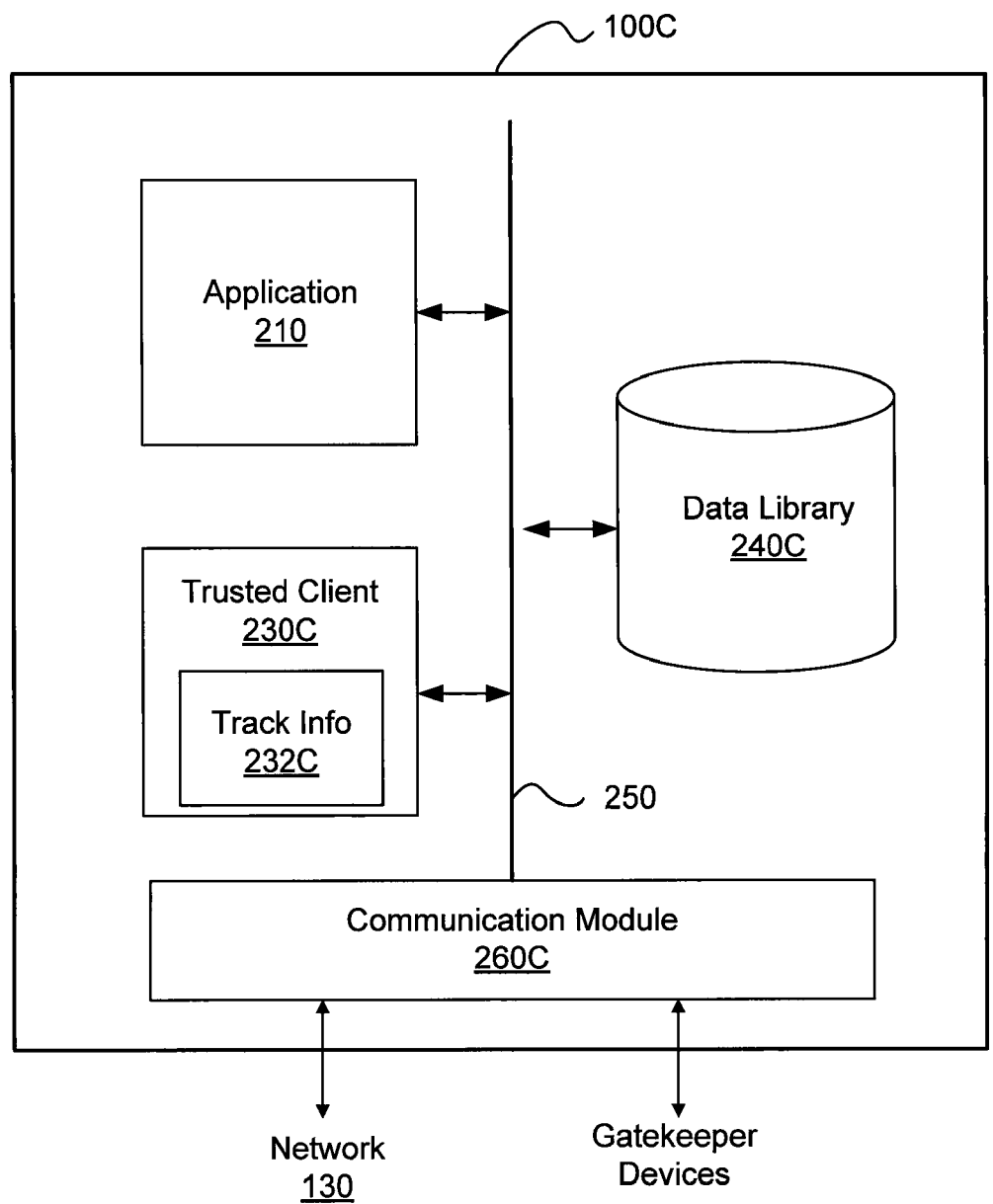
FIG. 2C is a block diagram illustrating an access device according to one embodiment.

FIG. 2C is a block diagram illustrating an access device 100C according to one embodiment. The access device 100C only receives metadata 134 from the gatekeeper device 100A-B but it does not have capability to send metadata to other devices to delegate or transfer access to the resources The access device 100C of FIG. 2C is essentially the same as the access device 100B except that the access device 100C does not include the handover module 270, the device information module 280, and the device detection module 220 of FIG. 2B. The functions and operations of the application 210, the trusted client 230C, the data library 240C and the communication module 260 are essentially the same as explained above with reference to the embodiment of FIG. 2B.

Data Library and Metadata Structure

Figure 3:
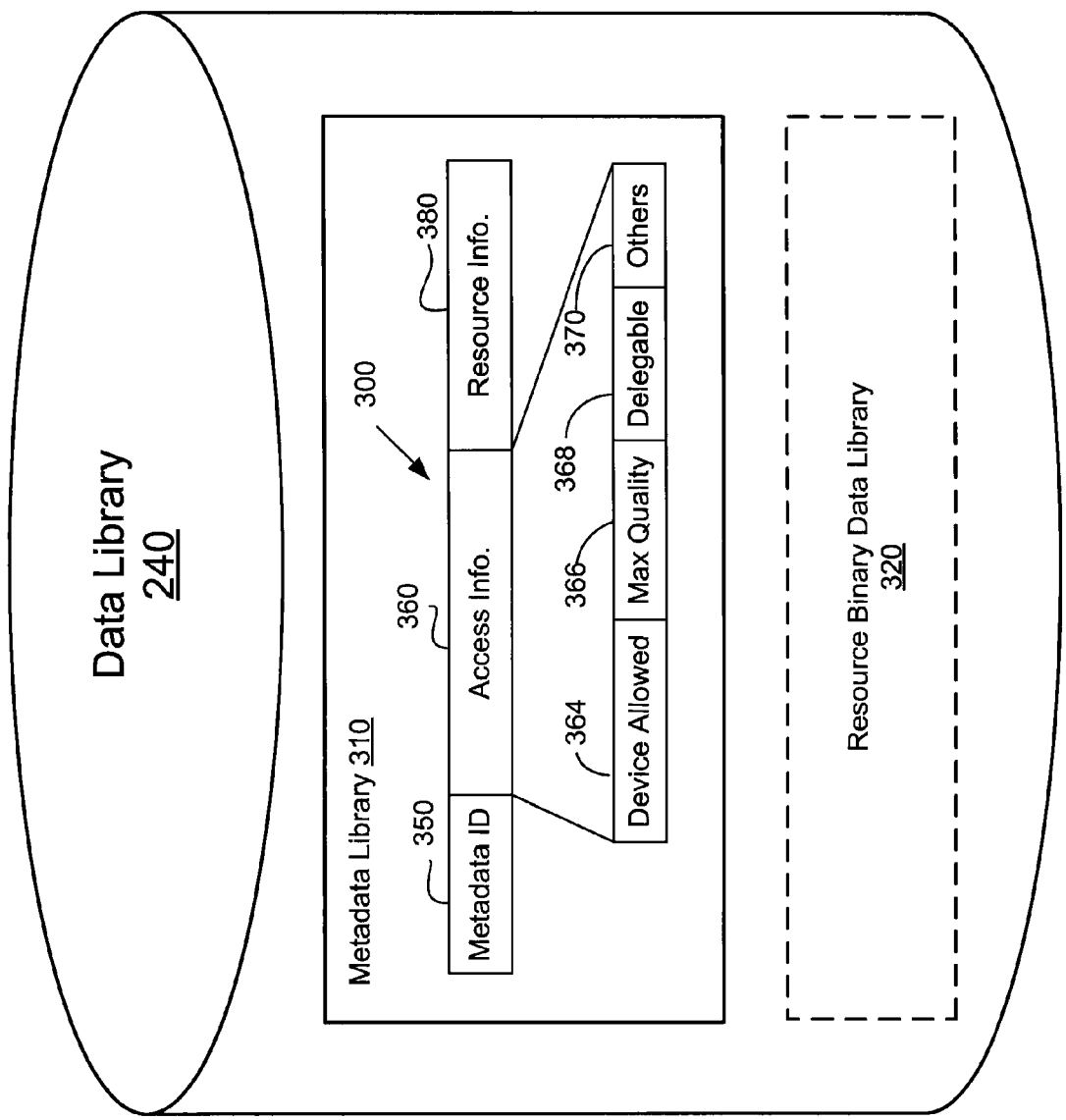
FIG. 3 is a block diagram illustrating a data library of a device, according to one embodiment.

FIG. 3 is a block diagram illustrating a data library 240 of the access device, according to one embodiment. The data library 240A of FIG. 2A and the data library 240B of FIG. 2B are collectively referred to as the data library 240. The data library 240 may also store the resource associated with the metadata as explained above with reference to the embodiment of FIG. 2B.

In the embodiment of FIG. 3, the data library 240 includes a metadata library 310. The data library 240 may also include a resource binary data library 320 as explained above with reference to the embodiment of FIG. 2B. In the embodiment of FIG. 2A, the data library 240A does not include the resource binary data library because the device 100A does not have any application programs to access resources. The metadata library 310 stores the metadata of the access device 100.

The resource binary data library 320 stores the binary data of the resources associated with the metadata. The resource binary data library 320 is managed by the trusted client 230 (the trusted client 230A of FIG. 2A and the trusted client 230B of FIG. 2B are collectively referred to as the trusted client 230) in a manner that complies with any restrictions imposed by the access information of the metadata. For example, the resource binary data library 320 may store only a portion of the resource, or the binary data of the resource may reside temporarily on the resource binary data library 320 if the access information restricts the access time of the resource. In one embodiment, the resource binary data library 320 serves as a temporary cache for streaming resources such as a video or radio feed. The data stored in the resource binary data library 320 may then be used by the application to access the streaming resources.

The metadata library 310 includes metadata 300 for a number of resources. The metadata 300 may include, among other fields, a metadata ID field 350, an access information field 360, and a resource information field 380. The metadata ID field 350 may be any unique sequence that identifies one metadata from another metadata.

The access information field 360 includes the access information. In the embodiment of FIG. 3, the access information field includes, among other fields, a device allowed field 364, a maximum quality field 366, a delegable field 368, and an "others" field 370. The access information is used by the trusted client 230B to ensure that the resource is accessed by the device 100B in a manner consistent with a DRM scheme.

The device allowed field 364 indicates on which types of access devices the resource may be accessed. For example, a resource may be allowed to access on an access device with a screen having a resolution of 640×480 pixels or lower but not on an access device having a screen with a higher resolution.

The maximum quality field 366 indicates the maximum quality of the resource that may be accessed. For example, the maximum quality field 366 may limit the sampling rate of the resource (e.g., 22 kHz), limit the list of resolutions that are allowed (e.g., 640×480 vertical lines) or the codecs that can be used. The maximum quality field 366 may include the list of permitted codecs and resolution/sampling rate (e.g., mp4 at 640×480, mp4 at 1068×780, AMR at 4 kbps, AMR at 8 kbps, and VSELP at 16 kbps).

The delegable field 368 indicates whether access to the resource may be delegated to other access devices.

The "others" field 370 may include other types of restrictions such as the number of times the resource may be accessed, the duration the access is allowed, and whether the whole resource may be accessed or only a portion of the resource may be accessed. It is possible to implement various types of restrictions by changing the restrictions included in the "others" field 370.

The resource information field 380 includes the resource information. The resource information identifies the resource. In one embodiment, the resource information comprises ID3 tags or APEv2 tags. In another embodiment, the resource information includes a Universal Resource Locator (URL) address from which the resource may be retrieved.

The fields illustrated in FIG. 3 and explained above are merely an example. Various other fields may be included or omitted according to the DRM schemes or access device configurations.

Recourse Sever Structure

Figure 4:
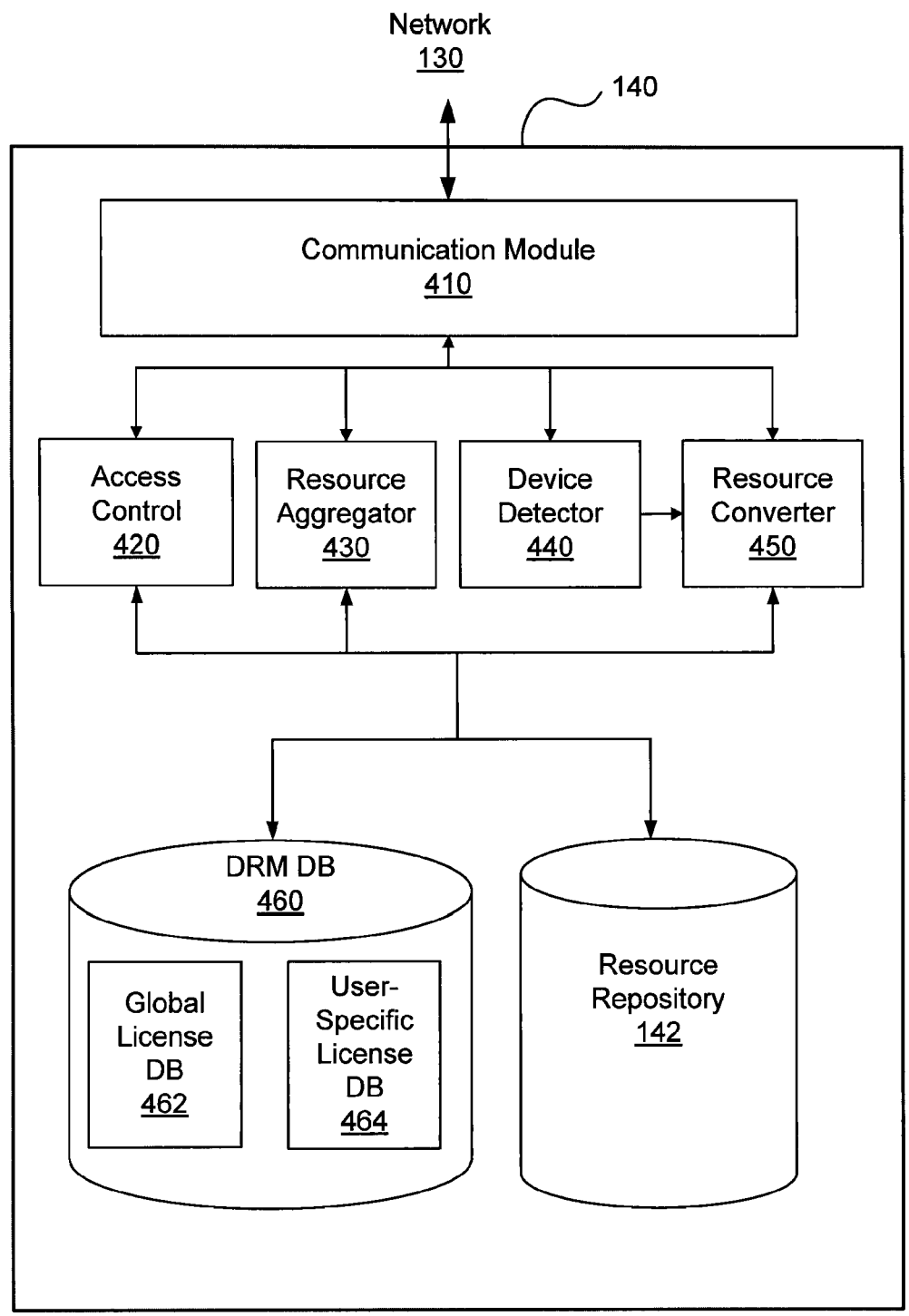
FIG. 4 is a block diagram illustrating a resource server, according to one embodiment.

FIG. 4 illustrates an example embodiment of the resource server 140. The resource server 140 includes, among other modules, a communication module 410, an access control module 420, a resource aggregator 430, a device detector 440, a resource converter 450, a digital rights management database (DRM DB), and a resource repository 142. The communication module 410 communicates with the gatekeeper device 100A, the access devices 100B-D, and the resource repositories 122A-N through the network 130. The resource server 240 receives the metadata from the devices 100A-D via the communication module 410 and sends the resources to the access devices 100B-D via the communication module 410 responsive to receiving the metadata.

The access control module 420 authenticates the devices 100A-D via the trusted client 230 of the devices 100A-D.

As explained above with reference to FIG. 3, the access information also identifies the restrictions associated with accessing the resource on the access devices 100B-D. The access control module 420 may also retrieve and match licensing information from the DRM DB 460 with the access information in the metadata to confirm whether the access devices 100B-D sending the metadata are authorized to receive the resource. The licensing information is explained below in detail with reference to the global license DB 462 and user-specific license DB 464. In one embodiment, the resource server 140 functions as a media store that sells license or right to access various resources. In one embodiment, the access control module 420 uses the credit card information received via the trusted client 230 to allow the users to purchase the resources.

The access control module 420, in conjunction with the communication module 410, may establish different sessions with the access devices 100A-D. In one embodiment, the sessions include, among other sessions, an access session and a management session. In the access session, the resource server 140 merely sends the resource to the access devices 100B-D after authenticating the identity of the users or the access devices. In the management session, the user communicates with the resource server 140 via the access device to carry out various activities, such as purchasing the resource, updating the user profile, changing the list of the access devices owned, adding unencrypted resources that can be freely accessed by others, and extending the user's right to access higher quality resources.

The resource aggregator 430 communicates with the resource repositories 122A-N of the service providers 120 to obtain the resources that are not available from its resource repository 142. If the metadata received from the access devices 100B-D is associated with a resource that is unavailable from the resource repository 142, the resource aggregator 430 searches the resource repositories 122A-N of other service providers 120. If the resource is found at the resource repositories 122A-N of the service providers 120, a link to the resource repositories 122A-N having the resource may be sent to the access devices 100B-D. Alternatively, the resource server 140 may function as a proxy to receive the resource and any licensing information associated with the resource from the resource repositories 122A-N. The licensing information may then be stored in the DRM DB 460, and the resource may be sent to the access devices 100B-D.

In one embodiment, the device detector 440 and the resource converter 450 ensure that the resource sent to the access devices 100B-D is in a format suitable for accessing the resource on the access devices 100B-D or suitable for sending the resource to the access device 100B-D. The device detector 440 receives the device information from the access devices 100B-D via the communication module 410 to determine the capabilities of the access devices 100B-D. The device detector 440 instructs the resource converter 450 to perform any conversion of the resources, if necessary so that the access devices 100B-D may access the resource received from the resource server 140. The conversion of the resource may include, among other operations, decoding, transcoding, deinterlacing, rate conversion, decrypting, and file format conversion.

The DRM DB 460 includes a global license database 462 and a user-specific license database 464. The global license database 462 includes license information of all the resources stored in the resource repository 142. The license information indicates the restrictions imposed by the media management company or the copyright owner to all of the users of the access devices who uses the resource server 140. For example, the media management company may decide to make a high-definition version of a resource only through offline stores and not available through the resource server 140. In this case, the license information indicates that the hi-definition version of the resource is not available through the resource server 140. Other restrictions imposed by the license information may include, among others restrictions, the encoding type of the resource, a maximum bit rate of the resource, an access type (e.g., streaming or download), the number of times the resource may be accessed, the access time during which access to the resource is allowed, the quality of resource (e.g., resolution) that the user may access, the number and types of access devices on which the resources may be accessed, whether the access device 100A storing the metadata may transfer license or sublicense the resource to other access devices 100B-D, and the portion of the resource that may be accessed from the access device.

The user-specific license database 464 stores information about the delegation or transfer of access to the resource by specific users of the gatekeeper devices 100A-B and the access devices 100B-D. In one embodiment, the user-specific license database 464 stores the track information 232 for each access device. In one embodiment, the gatekeeper devices 100A-B send to the resource server 240 the same metadata sent to the access devices 100B-D. The resource server 240 may use the metadata from the gatekeeper devices 100A-B to verify whether the request to access the resource by the access devices 100B-D is legitimate. The user-specific license database 464 may then be updated in accordance with the resource information and the access information of the metadata. In one embodiment, the user-specific license database 464 must conform to any restrictions imposed by the global license database 462.

The resource repository 142 stores the binary data of the resource or link addresses (e.g., Universal Resource Locator (URL)) from which the resource may be accessed. The resource repository 142 may store more than one versions of the resource in different formats. Storing different formats of the resources may be advantageous because the resource may be sent to the access devices 100B-D without any delays due to conversion at the resource converter 450.

In one embodiment, the resource server 140 includes a database (not shown) for storing information regarding the user profile. The access control module 420 of the resource server 140 may perform authentication of the access devices 100B-D using the user profile when the access devices 100B-D communicate with the resource server 140.

Each of these functional modules of the resource server 240 may be implemented separately or may be implemented together. For example, the resource repository 142 and the DRM DB 460 may be implemented as one module. Moreover, each module, whether alone or in combination with other components, may be implemented for example, in software, hardware, firmware or any other combination thereof.

Delegation or Transfer of Access to Resources

The delegation or transfer of access to the resource from the gatekeeper device 100A to the access devices 100B-D may take various forms. An example type of delegation is "transfer of license" from a gatekeeper device to an access device, and another example type of delegation is "sublicensing." Both the terms "transfer of license" and "sublicensing" are not legal terms used under intellectual property laws. Rather, these terms refer to a media management scheme and technical implementation under which access to the resource is restricted.

The "transfer of license" refers to a transaction or communication between a gatekeeper device and an access device in which the gatekeeper device sending the metadata does not maintain access to the resource. On the other hand, "sublicensing" refers to a transaction or communication between a gatekeeper device and an access device in which the gatekeeper device sending the metadata maintains the access to the resource (if the gatekeeper device has the capacity to access the resource).

Referring to FIG. 1, an example of transferring the license is illustrated where the gatekeeper device is the access device 100B and the access device is the access device 100D. In this example, the gatekeeper device 100B sends a metadata 134 associated with the resource to the access device 100D. The trusted client 230B of the gatekeeper device 100B (which also functions as an access device) may delete the metadata and the resource from the data library 240 because the license to access the resource is transferred to the access device 100D and the user may no longer access the resource from the access device 100B. The metadata 134 may also be sent to the resource server 140 to update the user-specific license database 464 of the resource server 140.

Various restrictions to the transfer of the resource may be implemented. For example, the transfers may be allowed only up to a certain number, the license may not be granted to certain types of access devices, or the transfer of license of certain resources may be prohibited. The media management company (or individual copyright owners) may charge different fees to the resources depending on the restrictions imposed on the transfer of license.

Referring to FIG. 1, an example of sublicensing is illustrated where the gatekeeper device is the access device 100A and the access device is the access devices 100C-D. When the gatekeeper device 100A sublicenses the access to the resource, the gatekeeper device 100A sends the metadata 132 to the access devices 100C-D. The access devices 100C-D then send the metadata 132 to the resource server 140 so that the user-specific license database 464 is updated to allow the access devices 100B-C to access the resource from the resource server 140. Then the access devices 100B-C receive the resource from the resource server 140.

Like the transfer of a license, various restrictions may be imposed on the sublicense. The various restrictions include, for example, allowing sublicensing to only a certain number of access devices, allowing the access devices to access only the version of the resources having inferior quality, limiting the effective duration of the resource, limiting the portion of the resource that may be played on the access devices, or limiting the number of the access devices that may simultaneously accessing the resource. In one embodiment, the access devices 100B-C access the resource using a sublicense only when the gatekeeper device 100A is in proximity to the access devices 100B-C, and the access to the resource by the access devices 100B-C is revoked when the gatekeeper device 100A is no longer in proximity to the access devices 100B-C.

In one embodiment, "grandchild sublicensing" may also be implemented. Referring to FIG. 1, the access device 100A may delegate access to the resource to the access device 100B by sending the metadata 132 to the access device 100B. The access device 100B may then sublicense the access device 100D by sending the metadata 134 to the access device 100D. From the perspective of the access device 100A, the access device 100D is a "grandchild sublicense" because the access device 100D received the sublicense from its sublicense (the access device 100B).

In one embodiment, the restrictions accompanying a sublicense may be different from the grandchild sublicense. For example, the access device receiving grandchild sublicense from another access device or gatekeeper device may be subject to more rigorous restrictions compared to the access device receiving a sublicense from another access device or gatekeeper device. For example, the access device receiving a sublicense may access the full length of the resource, whereas the access device receiving a grandchild sublicense may access only a segment of the resource.

The transfer of license and sublicensing as described herein is merely one example implementation. The transaction may be modified to result in a hybrid of both transfer of licensing and sublicensing. Also, the transfer of license or sublicensing may be contingent upon various conditions such as the purchase of other related resources or the purchase of specific access devices.

By varying the restrictions of the access of access devices by the gatekeeper device and the access devices, various types of DRM schemes may be implemented. In one embodiment, the global licensing database 462 of the resource server 140 may be configured to coordinate various metadata transactions between the gatekeeper devices and the access devices. In one embodiment, the user is presented with the same user interface despite the differences in the DRM schemes so that the DRM scheme associated with the resource is transparent to the user.

Method of Delegating or Transferring Access to Resource

Figure 5A:
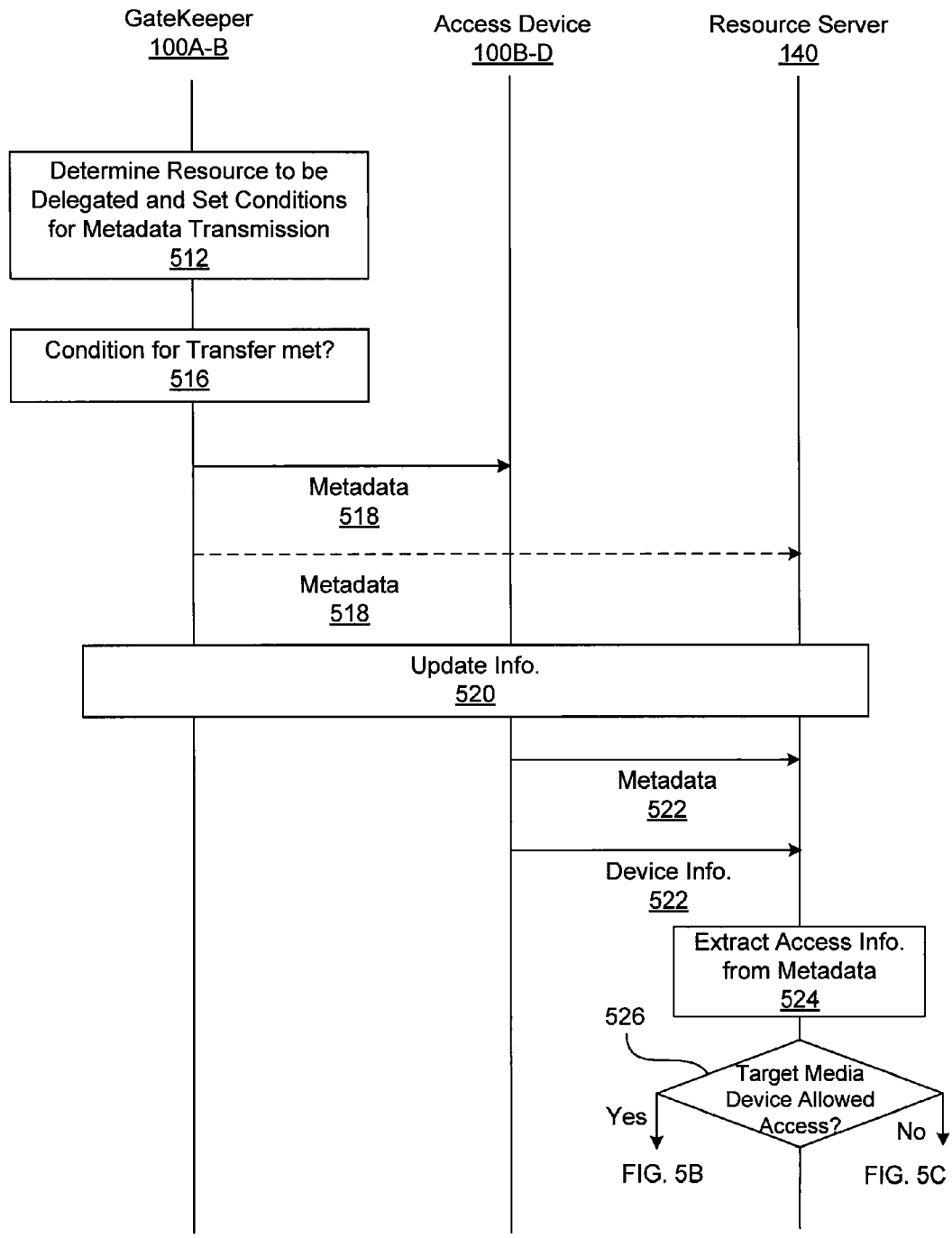
FIGS. 5A-5C are flowcharts illustrating a method for transferring or delegating access to a resource from a gatekeeper device to a device, according to one embodiment.
Figure 5B:
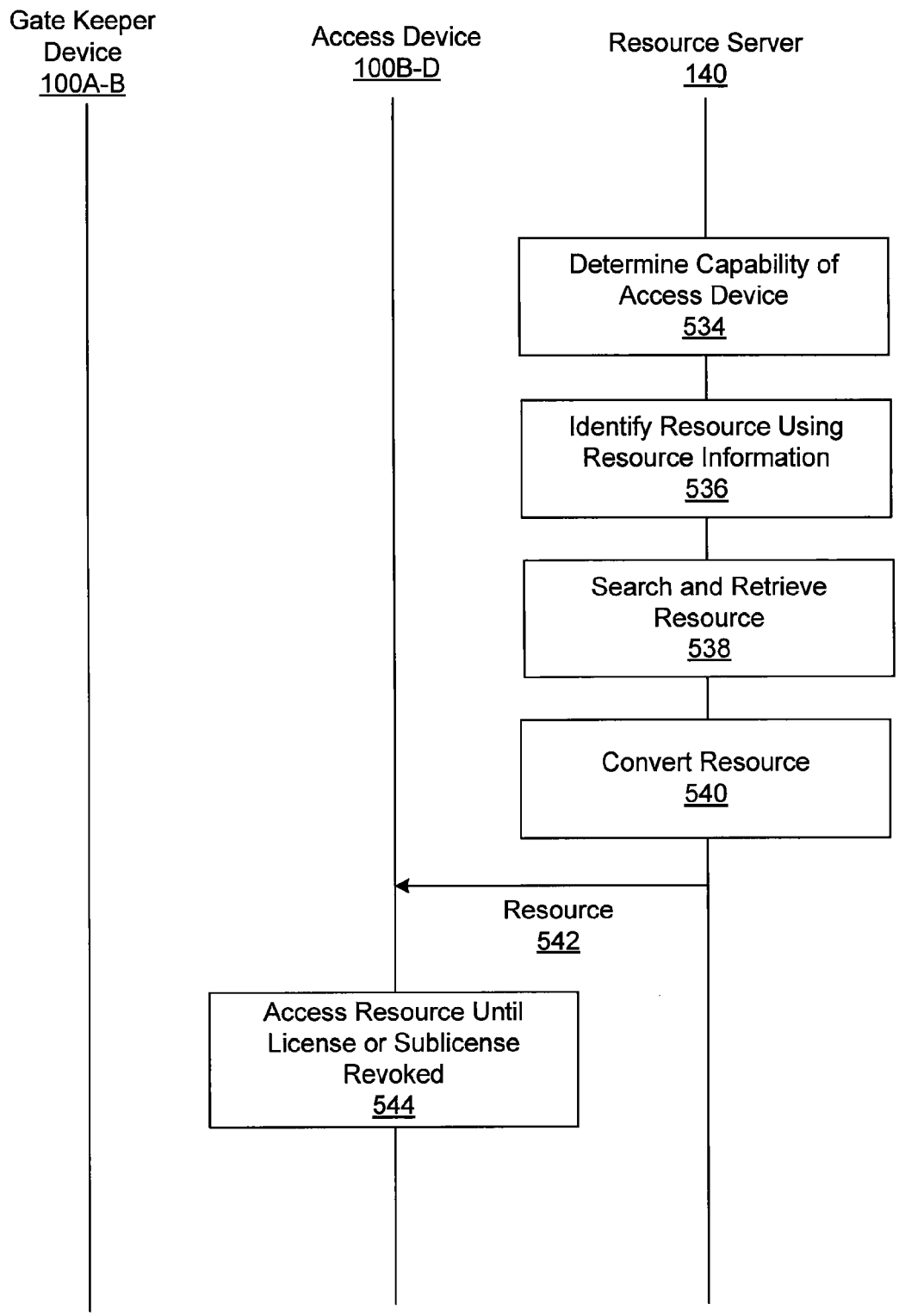
Figure 5C:
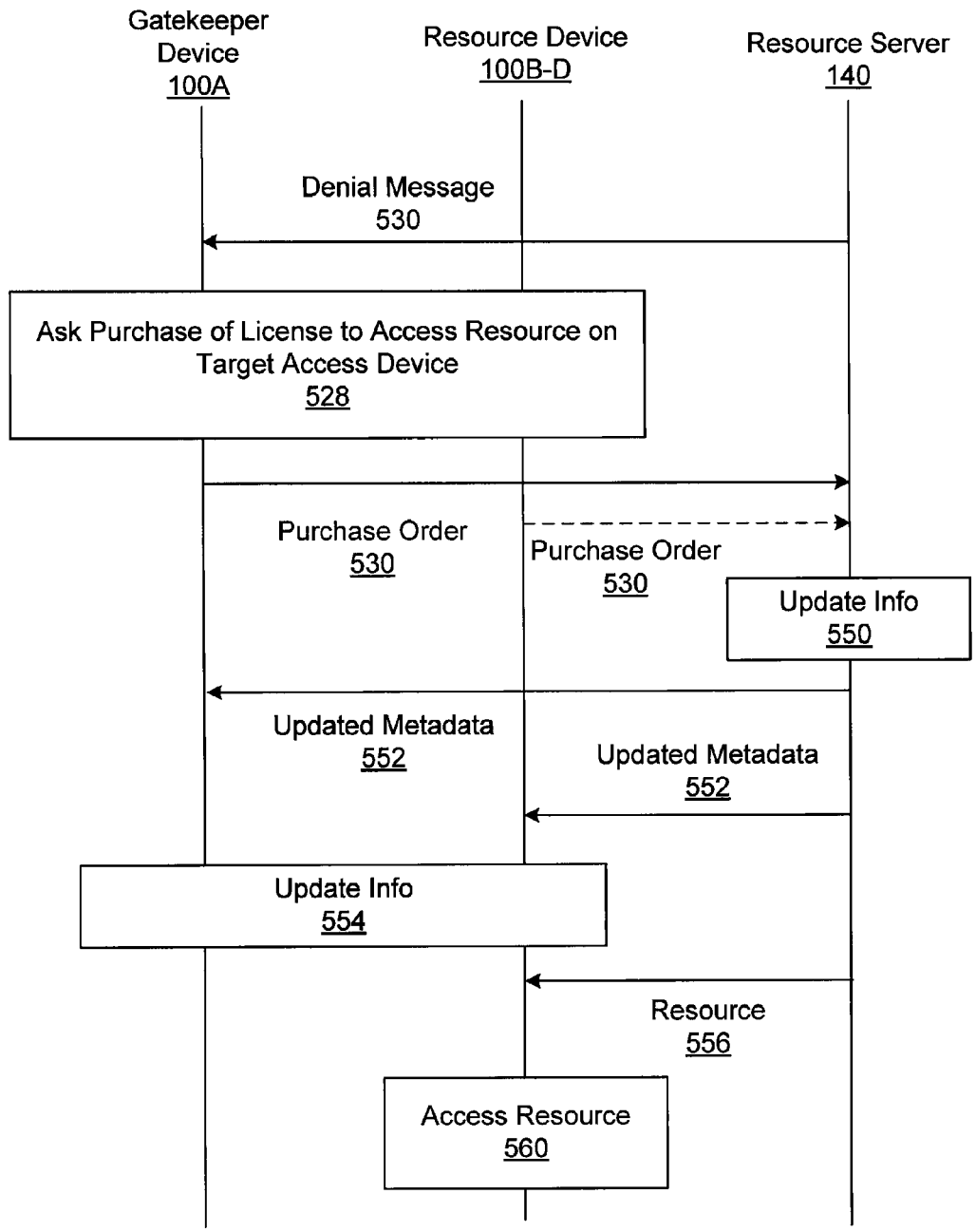

FIGS. 5A-5C are flowcharts illustrating a method of accessing the resource from multiple access devices 100B-100D, according to one embodiment. First, a single resource or a list of multiple resources to be delegated to the access devices 100B-100D is chosen and the conditions for transmitting the metadata from the gatekeeper device to the access device are set 512. The access devices may be selected manually by the user, or it may be detected automatically using a discovery process involving technology such as multicast Domain Name Server (mDNS), and Domain Name Server Service Discovery (DNS SD). When manually setting the access device, the user may designate information to identify the access device, such as an IP address, a network name, or MAC addresses. In one embodiment, the list of access devices is generated or obtained from applications such as an instant messaging system or data storage that maintains contact information.

The conditions for transmitting the metadata may include, among other conditions, the proximity between the gatekeeper devices 100A-B and the access devices 100B-D. In one embodiment, the condition for transmitting the metadata is satisfied by detecting the heartbeat signal indicating the proximity between the gatekeeper devices 100A-B and the access devices 100B-D. In another embodiment, the condition is an approval or acceptance by users of the access devices 100B-D to receive the resource from the gatekeeper devices 100A-B.

Then it is determined 516 whether the conditions for the transfer of the metadata are met. If the conditions are not met, the step is looped to wait for the conditions to be met. If the conditions are met, the gatekeeper devices 100A-B send 518 the metadata to the access devices 100B-D. In one embodiment, the gatekeeper devices 100A-B send 518 the metadata to the remote server 140 so that the remote server 140 may perform further verification on whether the access devices 100B-D should receive the resource.

Then the gatekeeper devices 100A-B, the access devices 100B-D, and the resource server 140 update 520 their information. Specifically, if the gatekeeper devices 100A-B transfer the license to the targeting access devices 100B-100D, the metadata and the resource being transferred are deleted from the metadata library 310 and the resource binary data library 320 of the gatekeeper devices 100A-B. Conversely, the access devices 100B-D generate the metadata from the metadata and store the metadata on the metadata library 360. If the gatekeeper devices 100A-B give a sublicense to the resource to the access devices 100B-D, then the metadata and the resource are maintained in the gatekeeper devices 100A-B. The track information 232 of the gatekeeper devices 100A-B is updated to indicate that access to the resource is delegated or transferred to the access devices 100B-D. After receiving the metadata from the gatekeeper devices 100A-B, the resource server 140 updates the user-specific license DB 464 to indicate that the resource is sublicensed to the access devices 100B-D.

Then the access devices 100B-D send 522 the metadata and the device information to the resource server 140. The remote server 140 extracts 524 the access information from the metadata received from the access devices 100B-D. Based on the device information and the access information, the resource server 140 determines whether the access devices 100B-D should be allowed access to the resource.

FIG. 5B illustrates the process where the access devices 100B-D are determined to have access to the resource. If the access information indicates that the license or the sublicense allows the access devices 100B-D to access the resource, capabilities of the access devices 100B-D are determined 534 based on the device information. The resource server 140 then identifies 536 the resource associated with the metadata based on the resource information. Then, the resource server 140 searches and retrieves 538 the resource from its resource repository 142 or from the resource repositories 122A-N of other service providers 120. If the resource associated with the metadata is not available from its resource repository 142, the resource server 140 locates and retrieves the resource from various resource repositories 122A-122N. When obtaining the resource from other service providers 120, the resource server 140 serves as a proxy of the access devices 100B-D.

If necessary, the resource server 140 then converts 540 the resource into a format suitable or optimal for accessing the resource on the access devices 100B-D or in a format suitable for sending the resource to the access devices 100B-D. The remote server 140 then sends 542 the converted resource to the access devices 100B-D.

After receiving the resource, the access devices 100B-D are allowed to access 544 the resource until the delegation or transfer of access to the resource is revoked. The access to the resource may be revoked according to the restrictions of the DRM scheme, or because of a subsequent transfer of resource access to another access device. The access to the resource may also be revoked according to the restrictions of the DRM scheme or if the conditions for the access are no longer satisfied. In one embodiment, the sublicense is revoked if the gatekeeper device 100A or the access devices 100B-D may no longer detect the heartbeat signal of the counterpart access device(s) or the strength of the heartbeat signal is below a threshold level.

FIG. 5C illustrates the process where the access information indicates that the license or the sublicense given to the access device 100B-D does not allow the access device 100B-D to access the resource (e.g., the access device 100B-D has capabilities exceeding what the license or the sublicense allows), then a denial message is sent 530 to the gatekeeper devices 100A-B. Optionally, the user may be asked 528 to purchase a license to access the resource on the access devices 100B-D.

If the user purchases additional license to access the resource, a purchase order is sent 530 from the gatekeeper devices 100A-B or the access devices 100B-D to the resource server 140. Then the DRM database 460 of the resource server 140 is updated 550 to indicate that the user has access to the resource on the access device 100B-D. The resource server 140 then sends 552 an updated metadata to the gatekeeper device 100A and the access device 100B-D. The gatekeeper devices 100A-B and the access device 100B-D update the metadata library 310 to indicate that the resource is accessible on access devices 100B-D. The resource is then sent 556 from the resource server 140 to the access device 100B-D. The resource is then accessed 560 from the access device 100B-D.

If the user does not purchase the license to access the resource on the access device 100B-D, access to the resource by the access devices 100B-D is denied and the process ends.

Handover Operation

Figure 6:
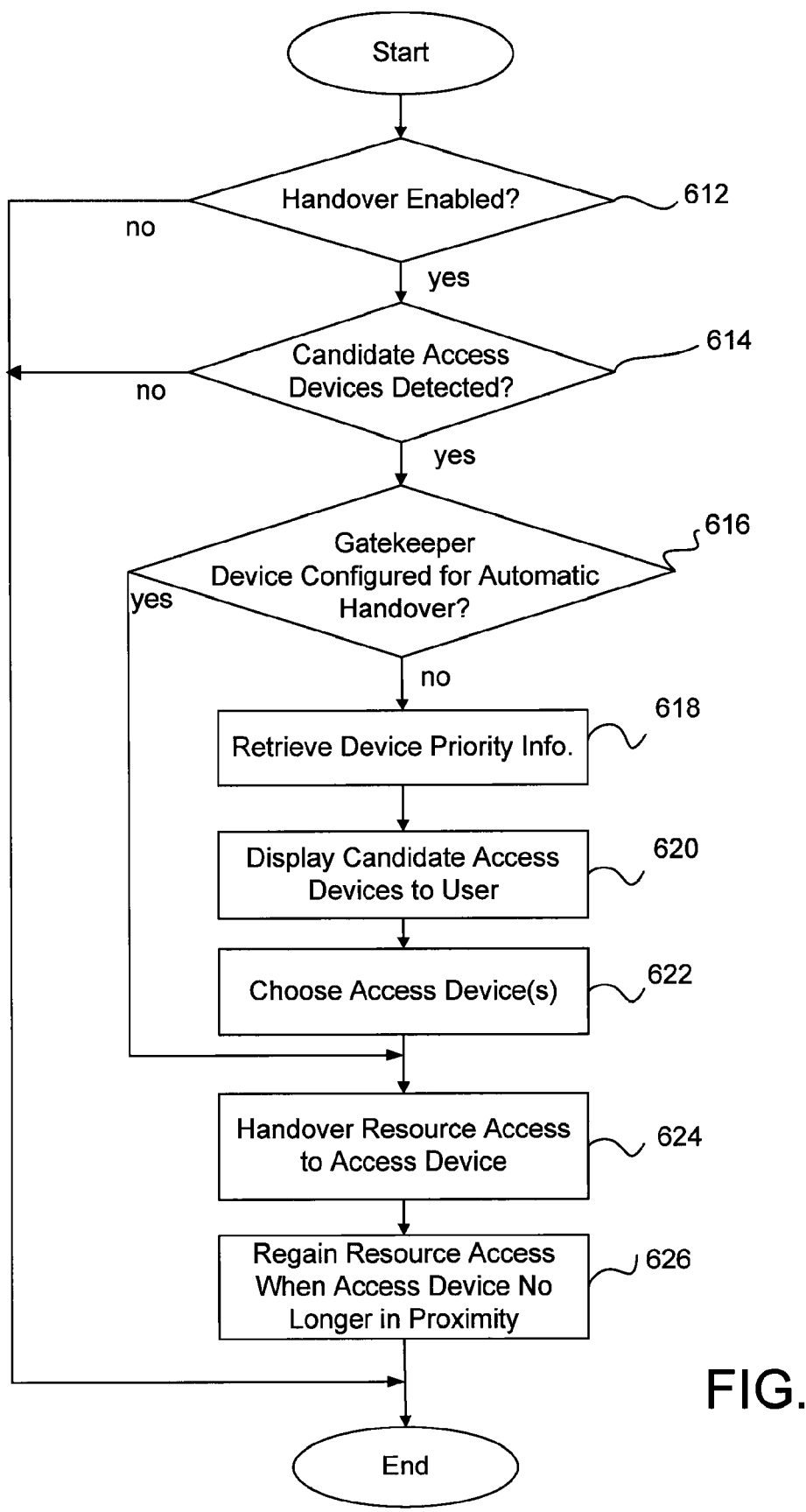
FIG. 6 is a flowchart illustrating a method of handing over access to a resource, according to one embodiment.

FIG. 6 is a flowchart of a method for handing over access to the resource from the gatekeeper device 100B to the access device 100C-D according to one embodiment. First, it is determined 612 if the handover operation is enabled. If the handover operation is disabled, then the process ends. If the handover operation is enabled, the candidate access devices are detected 614. The candidate access devices refer to the access devices to which the access to the resource may be delegated. In one embodiment, the gatekeeper device 100B determines which candidate access devices are capable of accessing the resource. In one embodiment, the capable devices are detected using the heartbeat signal that identifies the identity (or capabilities) of the access devices 100B-D as well as the proximity between the gatekeeper device 100B and the access devices 100C-D. If no candidate access devices are detected, then the process ends without handing over the access of the resource.

If the candidate access devices are detected, then it is determined 616 whether the gatekeeper device 100B is configured for an automatic handover. If the gatekeeper device 100B is not configured for the automatic handover, the handover module 270 determines whether more than one capable access devices are detected. If more than one candidate access devices are detected, the handover module 270 retrieves the device priority information 272. Based on the device priority information 272, the handover module 270 displays 620 the candidate access devices 100C-D. The user then chooses 622 one or more access devices from the list of the candidate access devices displayed on the gatekeeper device 100B. The gatekeeper device 100B then proceeds to handover 622 the resource access to the access devices 100C-D. In one embodiment, the handover is carried out by sending the metadata from the gatekeeper device 100B to the access devices 100C-D as explained above with reference to FIGS. 5A-5C.

If it is determined in step 616 that the automatic handover is enabled, then the process proceeds directly to handing over 624 the resource access to the access devices 100C-D. When the automatic handover is enabled, the gatekeeper device 100B automatically identifies the access devices 100C-D based on the preset user configurations or capabilities of the access devices 100C-D. Then the gatekeeper device 100B hands over 624 the resource access to the access devices 100C-D.

In one embodiment, when the access devices 100C-D are no longer in proximity to the gatekeeper device 100B, the gatekeeper device 100B regains access to the resource. As explained above with reference to FIGS. 5A-5C, the gatekeeper device 100B may regain access while the access device 100C-D terminates the access to the resource. In one embodiment, the gatekeeper device 100B regains access to the resource when the heartbeat signal of the gatekeeper device 100B is not detected by the access device 100C-D, when the heartbeat signal of the access device 100C-D is not detected by the gatekeeper device 100B, or when the strength of the heartbeat signal detected is below a threshold value. After regaining the resource access by the gatekeeper device 100A, the process ends.

Figure 7:
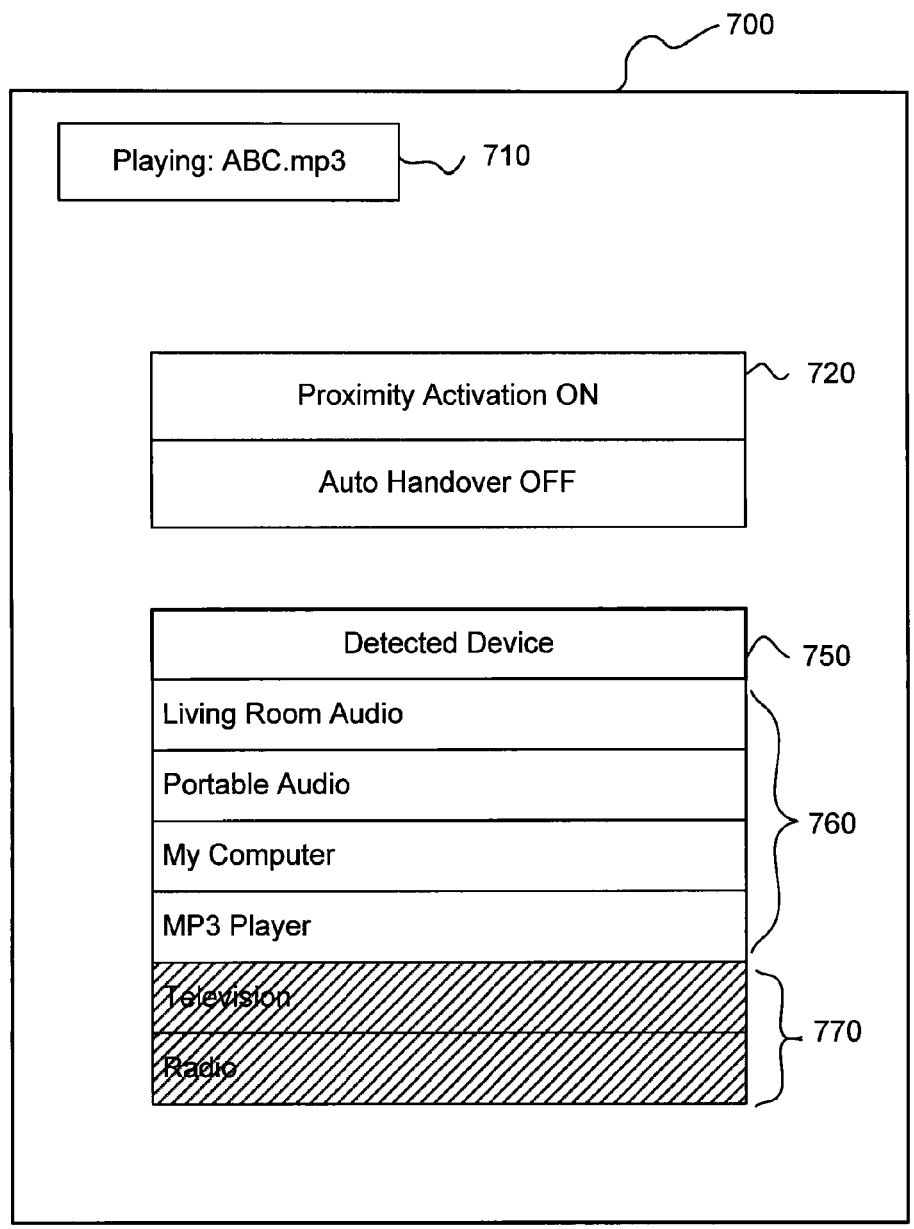
FIG. 7 is a diagram illustrating an example screen of a gatekeeper device for presenting the user with candidate devices for a handover operation, according to one embodiment.

FIG. 7 is a diagram illustrating an example screen of the gatekeeper device 100B while performing a handover operation. In this example, the screen 700 of the gatekeeper device 100B shows the resource 710 (ABC.mp3) being accessed (e.g., played) by the gatekeeper device 100B. The configuration window 720 shows that the proximity activation is enabled. The proximity activation indicates that the delegation or transfer of resource access to the access devices 100C-D is active only when the gatekeeper device 100B and the access devices 100C-D are in proximity. Therefore, the device detection module 220 of the gatekeeper device 100B detects if there are any candidate access devices near the gatekeeper device 100B.

In the example of FIG. 7, the automatic handover is disabled. Therefore, the access to the resource is not automatically handed over to the access devices 100C-D. A detected device window 750 shows the candidate access devices for the handover of the access to the resource. In this example, a living room audio, a portable audio, a computer, an MP3 player, a television, and a radio are detected as the candidate access devices. The access devices capable of accessing the resource (i.e., ABC.mp3) are shown in an upper portion 760 of the detected device window 750 whereas the candidate access devices incapable of accessing the resource are shown in a lower portion 770 of the detected device window 750. The user may select one or more access devices from the upper portion 760 of the window 750 to start accessing the resource on those access devices.

Alternative Embodiments

In one embodiment, the resource is medical records or confidential information. The access devices are medical devices or secured equipments (e.g., computer system storing confidential information) that read the resources and allow access after receiving the metadata from the gatekeeper device in the form of a proximity or magnetic card.

In one embodiment, the resource server 140 includes an operating system support system (OSS) to support system management of the resource server 140. The operation supported by the OSS includes, among others, collecting and assessing communication traffic information, provisioning, customer relationship management (CRM), and implementing measures against fraud. The resource server 140 may also include a business support system (BSS) for managing any billing issues with the users of the gatekeeper devices and the access devices, and settling any business matters among stakeholders including service providers, manufacturers, subscribers, and device owners.

In one embodiment, the resource server 140 is capable of storing personal resources sent by the user of the access devices. In this embodiment, the access control module 420 may implement a filtering mechanism for fingerprinting the resources sent from the user to ensure that the resource stored on the resource server 140 does not violate copyright law. In one embodiment, the fingerprinting is implemented by "smart checksum" that enables the resource to be identified even when there is modification to the resource. The resources sent by the user may be stored and shared by users of other access devices. If the user sending the resource is the copyright holder, the user may set any restrictions to the license or sublicense of the resource to other users. Alternatively, the resources sent by the user may be reserved for exclusive use of that user.

In one embodiment, the gatekeeper device is used as a sales tool by a physical store. A potential customer may access resources (e.g., media items) when in the store but need to purchase the right to access the resources after he leaves the store. For example, the gatekeeper device and the access device can be used in concerts, theaters, museums where exhibits associated with the resources may be on display. The access device receives the metadata that enables the access device to use part of the resources received from the gatekeeper device, but the user needs to complete a purchase to extend the right to access the resources.

The foregoing description of the embodiments of the invention has been presented for the purpose of illustration; it is not intended to be exhaustive or to limit the invention to the precise forms disclosed. Persons skilled in the relevant art may appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Embodiments of the invention may also relate to an apparatus for performing the operations herein. The access devices and the resource server may be specially constructed for the required purposes, or it may comprise a general-purpose computing device selectively activated or reconfigured by a computer program stored in the computer. The computer program may be binary codes compiled from various computer languages or it may be applet that operates on other application programs. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capabilities.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

An advantage of the above method and system is that the transfer of license or sublicensing of a resource may be accomplished without transmitting the resources between the access devices. Therefore, the data transmitted between the access devices may be reduced significantly. Another advantage is that various digital rights management schemes may be implemented transparent to the user. Still another advantage is that the user may access the resource seamlessly on different access devices despite differences in hardware or software configuration of the access devices.

Finally, it should be noted that the language used in the specification has been principally selected for readability and instructional purposes, and it may not have been selected to delineate or circumscribe the inventive subject matter. Accordingly, the disclosure of the embodiments of the invention is intended to be illustrative, but not limiting, of the scope of the invention, which is set forth in the following claims.

What is claimed is:

1. A method for accessing a resource by multiple devices, comprising:
    receiving first access information from a gatekeeper device by an access device, the first access information and representing right to access the resource subject to at least one restriction associated with a relationship between the gatekeeper device and the access device;
    determining by the access device whether the access device has the right to access the resource based on the first access information and the relationship between the gatekeeper device and the access device;
    receiving the resource associated with the first access information at the access device from a resource server responsive to determining that the access device has the right to access the resource;
    accessing the resource by the access device in compliance with the at least one restriction as defined by the first access information;
    terminating access to the resource by the access device responsive to a change or termination of the relationship between the gatekeeper device and the access device;
    sending device information from the access device to the resource server for determining one or more formats of the resource accessible by the access device, the device information describing one or more capabilities of the access device;
    receiving the resource from the resource server by the access device in a format accessible to the access device;
    at the access device, generating second access information from the first access information, the second access information allowing another access device to access the resource subject to another restriction that is more restrictive than the at least one restriction; and
    sending the second access information from the access device to the other access device.

2. The method of claim 1, further comprising:
    sending authentication information from the access device to the resource server, the authentication information identifying the access device to the resource server; and
    determining whether to send the resource from the resource server to the access device based on the authentication information.

3. The method of claim 1, wherein the at least one restriction further comprises a limit on a distance within which the gatekeeper device and the access device must be located for the access device to access the resource.

4. The method of claim 1, further comprising:
    responsive to the access device being a type of access device on which access to the resource is restricted by the first access information, prompting a message to a user of the access device asking the user of the access device to obtain or purchase a license to access the resource on the access device.

5. The method of claim 1, further comprising:
    detecting access devices located within a distance from the gatekeeper device;
    displaying the detected access devices to a user of the gatekeeper device; and
    receiving input from the user selecting the detected access device from which the resource is to be accessed.

6. The method of claim 5, wherein the detected access devices are displayed in an order based on the user's past history of selecting the access devices to access the resource.

7. The method of claim 1, further comprising:
    detecting access devices within a distance from the gatekeeper device; and
    determining automatically one or more detected access devices from which to access the resource based at least on one or more capabilities of the detected access device.

8. A method for accessing a resource by an access device, the method comprising:
    receiving first access information associated with the resource from a gatekeeper device, the first access information allowing the access device to access the resource subject to a first restriction associated with a relationship between the gatekeeper device and the access device, the gatekeeper storing and managing the first access information associated with the resource;
    determining by the access device whether the access device has right to access the resource based on the first access information and the relationship between the gatekeeper device and the access device;
    receiving the resource from the resource server responsive to determining that the access device has the right to access the resource;
    accessing the resource in compliance with the first restriction as defined by the first access information;
    terminating access to the resource responsive to a change or termination of the relationship between the gatekeeper device and the access device;
    at the access device, generating second access information from the first access information, the second access information allowing another access device to access the resource subject to another restriction that is more restrictive than the at least one restriction;
    sending the second access information from the access device to the other access device;
    sending device information representing one or more capabilities of the access device to the resource server; and
    receiving from the resource server the resource in a format accessible to the access device that is determined by the resource server based on the device information.

9. The method of claim 8, wherein the first restriction is a limit on a distance within which the gatekeeper device and the access device must be located to access the resource.

10. The method of claim 9, wherein the distance between the gatekeeper device and the access device is determined by detecting a wireless signal generated by the gatekeeper device or the access device.

11. The method of claim 10, wherein the access of the access device to the resource is terminated responsive to the wireless signal of the access device not being detected.

12. The method of claim 9, wherein the distance between the gatekeeper device and the access device is determined by detecting presence of a signal in a line between the gatekeeper device and the access device, the line having a predetermined length that defines the distance between the gatekeeper device and the access device.

13. The method of claim 8, further comprising maintaining a record of transmission of the second access information.

14. The method of claim 8, further comprising:
responsive to the access device being a type of access device on which access to the resource is restricted by the first access information, prompting a message to a user of the access device asking the user to obtain or purchase access to the resource on the access device.

15. The method of claim 8, further comprising:
detecting other access devices located within a distance from the access device;
displaying the detected access devices to a user of the access device; and
receiving input from the user selecting the detected access device from which the resource is to be accessed.

16. The method of claim 15, wherein the detected access devices are displayed in an order based on the user's past history of selecting the access devices to access the resource.

17. The method of claim 8, further comprising:
detecting access devices within a distance from the access device; and
determining automatically one or more detected access devices from which to access the resource based at least on one or more capabilities of the detected access device.

18. The method of claim 8, further comprising:
receiving energy to power the gatekeeper device from the access device.

19. The method of claim 18, wherein the gatekeeper device is a key fob or a contactless smartcard.

20. A computer program product comprising a non-transitory computer readable storage medium structured to store instructions executable by a processor, the instructions, when executed cause the processor to:
receive first access information associated with resource from a gatekeeper device, the first access information allowing an access device to access the resource subject to a first restriction associated with a relationship between the gatekeeper device and the access device, the gatekeeper storing and managing the first access information associated with the resource;
determine by the access device whether the access device has right to access the resource based on the first access information and the relationship between the gatekeeper device and the access device;
receive the resource associated with the first access information at the access device from a resource server responsive to determining that the access device has the right to access the resource;
access the resource in compliance with the restriction as defined by the first access information;
terminate access to the resource responsive to a change or termination of the relationship between the gatekeeper device and the access device;
at the access device, generate second access information from the first access information, the second access information allowing another access device to access the resource subject to another restriction that is more restrictive than the at least one restriction;
send the second access information from the access device to the other access device;
send device information representing one or more capabilities of the access device to the resource server; and
receive from the resource server the resource in a format accessible to the access device that is determined by the resource server based on the device information.

21. The computer program product of claim 20, wherein the first restriction comprises a limit on a distance within with the gatekeeper device and the access device must be located for access device to receive the resource.

22. The computer program product of claim 20, wherein the stored instructions further cause the processor to:
generate second access information derived from the first access information, the second access information allowing another access device to access the resource subject to a second restriction, the second restriction more restrictive than the restriction; and
send the second access information to the other access device.

23. The computer program product of claim 20, wherein the stored instructions further cause the processor to:
send device information representing one or more capabilities of the access device to the resource server; and
receive from the resource server the resource in a format suitable for the access device determined from the device information.

24. The computer program product of claim 20, wherein the stored instructions further cause the processor to:
responsive to the access device being a type of access device restricted by the first access information, prompt a message to a user of the access device asking the user to obtain or purchase a license to access the resource on the access device.

25. The computer program product of claim 20, wherein the stored instructions further cause the processor to:
detect other access devices located within a distance from the access device;
display the detected access devices to a user of the access device; and
receive input from the user selecting the detected access device from which the resource is to be accessed.

26. The computer program product of claim 25, wherein the stored instructions further cause the processor to display the detected access devices in an order based on the user's past history of selecting the access devices to access the resource.

27. The computer program product of claim 20, wherein the stored instructions further cause the processor to:
detect access devices within a distance from the access device; and
determine automatically one or more detected access devices from which to access the resource based at least on one or more capabilities of the detected access device.

28. An access device for accessing a resource, comprising:
a trusted client configured to control access to the resource by the access device using first access information, the first access information allowing the access device to access the resource subject to a first restriction associated with a relationship between a gatekeeper device and the access device, the trusted client configured to determine whether the access device has right to access the resource based on the first access information and the relationship between the gatekeeper device and the access device the trusted client configured to terminate access to the resource by the access device responsive to a change or termination of the relationship between the gatekeeper device and the access device, the trusted client of the access device further configured to generate and send second access information derived from the first access information to another access device via the communication module, the second access information allowing the other access device to access the resource subject to a second restriction;
a communication module coupled to the trusted client module and configured to communicate the first access information with the other access device, the communication module configured to receive the resource associated with the first access information from a resource server;
a memory coupled to the trusted client and configured to store the resource; and
a device information module configured to store device information representing one or more capabilities of the access device, the device information module configured to send the device information to the resource server via the communication module for the resource server to determine and send the resource to the access device in a format suitable to the access device.

29. The access device of claim 28, further comprising an application module coupled to the trusted client module for accessing the resource.

30. The access device of claim 28, further comprising a detection module for detecting a wireless signal from the other access device to determine a distance from the access device to the other access device, the trusted client sending the second access information to the other access device responsive to the other access device being within a distance from the access device.

31. The access device of claim 28, wherein the second restriction allowing the other access device to access the resource in a manner more restrictive than the first restriction imposed on the access device.

32. The access device of claim 28, wherein the first restriction comprises a limit on a distance within which the gatekeeper device and the access device must be located for the access device to access the media.

33. The access device of claim 28, further comprising:
a detection module for detecting the other access device within a distance from the access device; and
a device handover module operable to handover the access to the resource to the other access device.

34. A system for allowing multiple access devices to access a resource, comprising:
a gatekeeper device for storing and sending access information to an access device;
an access device configured to communicate with the gatekeeper device to receive the access information, the access information representing right to access the resource subject to at least one restriction associated with a relationship between the gatekeeper device and the access device, the access device configured to determine whether the access device has the right to access the resource based on the access information and the relationship between the gatekeeper device and the access device, wherein the access device is configured to terminate access to the resource responsive to a change or termination of the relationship between the gatekeeper device and the access device, the access device configured to store device information representing one or more capabilities of the access device; and
a resource server configured to communicate with the access device, the resource server sending the resource to the access device over a network responsive to a request from the access device to access the resource, the resource server further configured to receive the device information from the access device to determine and send the resource to the access device in a format suitable to the access device, wherein the resource server is further configured to convert the resource to a format optimal for accessing the resource on the access device or a format optimal for sending the resource to the access device.

35. The system of claim 34, wherein the resource server further comprises a resource aggregator for searching and retrieving the resource from other resource repositories responsive to the resource requested by the access devices not found in the resource repository.

36. The system of claim 34, wherein the resource server further comprises a device detector module for receiving device information from the access device and determining one or more capabilities of the access device based on the device information.

37. The system of claim 34, wherein the gatekeeper device sends the access information to the access device responsive to the access device being located within a distance from the gatekeeper device.

38. The system of claim 37, wherein the distance between the gatekeeper device and the access device is determined by detecting a wireless signal generated by the access device or the other access device.

39. The system of claim 37, wherein the distance between the gatekeeper device and the access device is determined by detecting presence of a signal in a line between the gatekeeper device and the access device, the line having a predetermined length that defines the distance between the gatekeeper and the access device.

40. The method of claim 1, wherein the first access information further imposes a restriction associated with a maximum number of times the resource is authorized for access on the access device.

41. The method of claim 1, wherein the first access information further imposes a restriction associated with a quality level of the resource that is authorized for access by the access device.

42. The method of claim 8, wherein the first access information further imposes a restriction associated with a maximum number of times the resource is authorized for access on the access device.

43. The method of claim 8, wherein the first access information further imposes a restriction associated with a quality level of the resource that is authorized for access by the access device.

44. The computer program product of claim 20, wherein the first access information further imposes a restriction associated with a maximum number of times the resource is authorized for access on the access device.

45. The computer program product of claim 20, wherein the first access information further imposes a restriction associated with a quality level of the resource that is authorized for access by the access device.

46. The access device of claim 28, wherein the first access information further imposes a restriction associated with a maximum number of times the resource is authorized for access on the access device.

47. The access device of claim 28, wherein the first access information further imposes a restriction associated with a quality level of the resource that is authorized for access by the access device.

48. The system of claim 34, wherein the access information further imposes a restriction associated with a maximum number of times the resource is authorized for access on the access device.

49. The system of claim 34, wherein the access information further imposes a restriction associated with a quality level of the resource is authorized for access by the access device.

* * * * *